March 23, 1937.　　　V. BENDIX　　　2,074,717
BRAKE
Filed March 13, 1931　　2 Sheets-Sheet 1

INVENTOR.
VINCENT BENDIX
BY
ATTORNEY.

March 23, 1937. V. BENDIX 2,074,717
BRAKE
Filed March 13, 1931 2 Sheets-Sheet 2

INVENTOR.
VINCENT BENDIX
BY
ATTORNEY.

Patented Mar. 23, 1937

2,074,717

UNITED STATES PATENT OFFICE 2,074,717

BRAKE

Vincent Bendix, Chicago, Ill., assignor to Bendix Brake Company, South Bend, Ind., a corporation of Illinois Application March 13, 1931, Serial No. 522,220

15 Claims. (Cl. 188—152)

This invention relates to brakes and is illustrated as embodied in an internal expanding hydraulic brake for an automobile.

An object of the invention is to provide a simple but powerful brake of this character, which may have a changing anchorage, and so arranged that in normal forward operation of the brake, the friction means does not leave its anchorage at any time.

In one desirable arrangement the parts are so arranged that the brake return springs cooperate with the fluid power applying means to hold one of a pair of articulated shoes (or an equivalent part) anchored except at such times as the brake drum is turning backwards and causes the anchorage to shift.

In one desirable construction the actuating means includes two pistons of different diameters, the larger one acting on the part of the friction means which leaves its anchorage during the normal forward operation of the brake.

According to an important minor feature of the invention, the shoes anchor against the brake applying cylinder.

A further object of the invention is to provide a brake wherein a maximum applying force may be applied to a predetermined friction element, preferably the brake member effective in forward braking, subsequent to the brake applying operation or "slack take-up" phase during which latter phase a minimum of braking fluid is depressed in the system.

In a preferred embodiment of this aspect of the invention, a double diametered fluid cylinder may be interposed between the free ends of oppositely disposed friction members which are each anchored at their other ends. The larger piston of the cylinder is preferably arranged to contact and operate the friction member which is more effective in forward braking and the smaller piston is arranged to operate the shoe effective in reverse braking.

The above and other objects and features of the invention, including various novel and desirable details of construction, will be apparent from the following description of one illustrative embodiment shown in the accompanying drawings in which.

Figure 1:
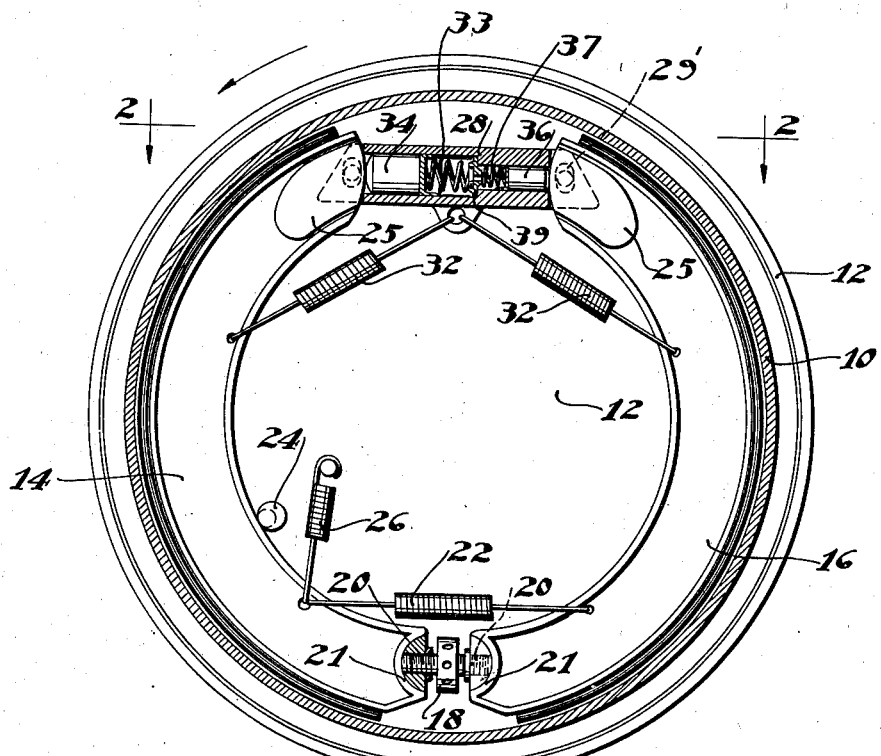
Figure 1 is a vertical section through the brake shoes just inside the head of the brake drum, and showing the brake shoes in side elevation.
Figure 2:
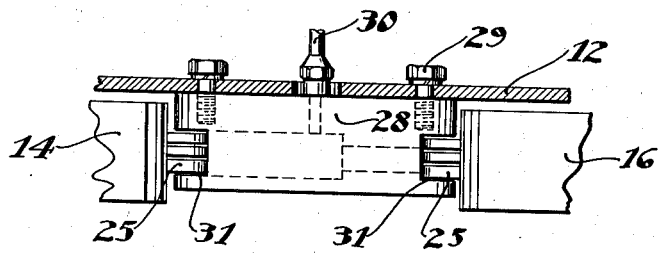
Figure 2 is a partial section on the line 2—2 of Figure 1, showing the hydraulic applying means in top plan.

The brake illustrated in Figures 1 and 2 includes a rotatable drum 10, at the open side of which is a support such as a backing plate 12, and within which is arranged the friction means of the brake. The friction means preferably includes a pair of floating shoes 14 and 16, connected for example, by a floating adjustable joint including a right and left threaded adjusting member 18, threaded into semi-cylindrical thrust blocks 20 seated in sockets 21 in the ends of the shoes. The shoes are held against blocks 20 by means such as a coil spring 22 tensioned between the shoes. Suitable shoe positioning device 24 may be provided, and the weight of the shoes may be counter-balanced by a spring 26.

The applying means of the brake includes a novel double diameter double-ended cylinder 28, adjustably mounted on the brake backing plate as by studs 29 and communicating by a conduit 30 with the hydraulic operating system, the studs 29 passing through slots 29'. Shoe 14, reinforced at the end of its web by plates 25, anchors the seated end against the cylinder within an end recess 31 therein, when the drum is turning clockwise (car moving backward), while shoe 16 similarly constructed at its end, anchors within a similar recess in the other end of the cylinder when the drum is turning clockwise (car moving forward).

The brake is applied, against the resistance of return springs 32, by pistons on plungers 34 and 36 in the ends of cylinder 28. Preferably piston 34 is of greater cross sectional area, that is of greater diameter, than piston 36 and the spring 32, acting on shoe 16, is sufficiently strong to neutralize the effect of piston 36 during the brake applying movement, so that in the normal forward operation of the brake, the shoe 16 is held in anchored position by the aforesaid spring 32, throughout the operation of applying the brake. Springs 33 and 37, positioned in contact with plungers 34 and 36 respectively and each abutting at their contiguous ends, a stop 39, serve to maintain the plungers in constant abutment with the shoe ends. The stop 39 comprises a disk formed with an opening through which liquid may pass from one side of the cylinder to the other and provided with a relatively small annular flange 51 extending into the right hand side of the cylinder and a relatively large annular flange 52 extending into the left hand side of the cylinder.

In reverse braking (the drum being at such times moving in a direction opposite to that indicated by the arrow), piston 34 moves shoe 14 against the drum during the first stage of the brake applying movement, shoe 14 is then forced into drum engagement and thereafter the drum friction shifts both pistons 34 and 36 to the right under the action of the shifting shoes 14 and 16, shoe 14 anchoring against cylinder 28 and shoe 16 engaging the drum. Further movement of the pistons 34 and 36, after full force is applied, completes the application of the brake, shoe 14 remaining anchored.

The supply of the liquid in cylinder 28 may be made greater in order to slow down the above shift of the anchorage to avoid any disagreeable shock.

Figure 3:
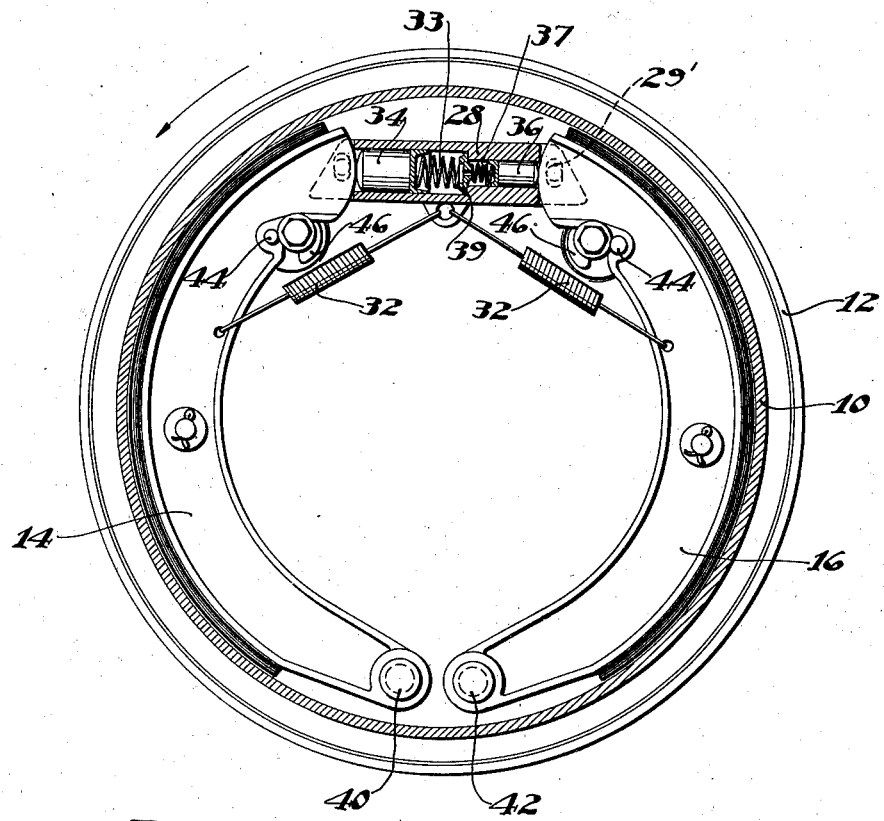
Figure 3 is a vertical section through a modified form of brake.

The brake disclosed in Figure 3 is in the main similar in structure to that of Figure 1, with the principal exception that each of the shoes 14 and 16 is individually anchored, at their ends remote from the fluid cylinder, by anchor pins 40 and 42 rigidly secured to the support plate 12. Springs 32, which are preferably of equal tension, function to determine the "brake off" position by forcing stop pins 44 on the shoes against adjustable stops 46 secured to the support plate. Double diameter fluid actuator and cooperating shoe ends are similar to the structure of Figure 1.

In the operation of this form of brake shown in Fig. 3, the forward shoe 14 and reverse shoe 16 will be successively forced into drum contact. Thereafter the forward shoe 14 will be subjected to the desired greater applying force, this by virtue of the area differential of the two pistons 34 and 36. It will be noted that this desired end is accomplished without increasing the total quantity of fluid displaced during the brake applying operation over that which is displaced in the conventional fluid cylinder having oppositely movable pistons of equal area. By increasing the volumetric area of the chamber A, Figure 3, above normal and reducing the capacity of chamber B below normal a like amount, the total capacity of both chambers obviously remains normal. The desired limited pedal travel during the "slack take-up" phase is thus maintained with the important added advantage, however, that the mechanical advantage of the mechanism as regards the forward shoe 14 is increased, thereby effecting the desired greater applying force upon the forward shoe.

While one desirable embodiment has been disclosed in detail, it is not my intention to limit the scope of the invention to that particular embodiment or otherwise, than by the terms of the appended claims.

This application constitutes a continuation in part of my co-pending application No. 320,236, filed November 19, 1928.

I claim:

1. A brake comprising, in combination, a drum, a floating friction element within the drum having separable ends and arranged to anchor at one end when the drum is turning in a forward direction and to anchor at the other end when the drum is turning in the other direction, a cylinder adjacent said ends, two pistons in the cylinder acting respectively on said ends and one of which is of greater diameter than the other, the smaller piston acting on the end of the floating friction element at which the element anchors when the drum is turning in the forward direction, and means yieldingly urging said ends and the pistons toward each other.

2. A brake comprising, in combination, a drum, a floating friction element within the drum having separable ends and arranged to anchor at one end when the drum is turning in the forward direction and to anchor at the other end when the drum is turning in the other direction, a cylinder adjacent said ends and arranged to take the braking torque from one or the other of said ends, two pistons in the cylinder acting respectively on said ends and one of which is of greater diameter than the other, the piston having the smaller diameter acting on the end of the floating element at which the element anchors when the drum is turning in the forward direction, and means yieldingly urging said ends and the pistons toward each other.

3. A brake operator comprising, in combination, a double-ended double-diameter cylinder, different-sized pistons in opposite ends of said cylinder, a stop fixed in the cylinder between the parts of different diameters, and springs confined between said pistons and the stop and urging the pistons outwardly.

4. A brake operating mechanism comprising, in combination, a double ended double diameter cylinder; different sized pistons in opposite ends of said cylinder; a stop in said cylinder positioned against the end wall of the cylinder portion of least internal diameter, said stop being provided with oppositely extending flanged portions; and springs confined between said pistons and said stop surrounding said flanged portions and arranged to urge the pistons outwardly away from said stop.

5. A brake comprising, in combination, a drum, a floating friction element within the drum having separable ends and arranged to have one part anchor when the drum is turning in the forward direction and to have a different part anchor when the drum is turning in the rearward direction, a cylinder adjacent to said element ends, and two pistons in the cylinder acting respectively on said element ends, one of said pistons having a greater diameter than the other and acting on the part which anchors when the drum is turning in the rearward direction.

6. A brake comprising, in combination, a drum, pivotally connected to rigid floating shoes within said drum arranged to anchor on one shoe when the drum is turning in the forward direction and to anchor on the other shoe when the drum is turning in the rearward direction, a fluid power cylinder between the ends of said shoes, and two pistons of different diameter positioned in said cylinder and arranged to operate said shoes, the piston having the larger diameter acting upon the shoe on which both anchor when the drum is turning in the rearward direction.

7. A brake comprising in combination a drum, a floating friction element within the drum having separable ends and arranged to anchor at one end when the drum is turning in a forward direction and to anchor at the other end when the drum is turning in a rearward direction, a cylinder adjacent to said ends, two pistons in the cylinder acting respectively on said ends, one of which has a greater diameter than the other and acts upon the end of the friction element which anchors when the drum is turning in a rearward direction.

8. A brake comprising in combination, a drum, a floating friction element within the drum having separable ends and arranged to anchor at one end when the drum is turning in a forward direction and to anchor at the other end when the drum is turning in a rearward direction, a cylinder adjacent to said ends, two pistons in the cylinder acting respectively on said ends, one of which has a greater diameter than the other and acts upon the end of the friction element which anchors when the drum is turning in a rearward direction, and means yieldingly urging said ends and the pistons toward each other.

9. A brake comprising in combination, a drum, pivotally connected rigid floating shoes within said drum arranged to anchor on one shoe when the drum is turning in a forward direction and to anchor on another shoe when the drum is turning in the rearward direction, a fluid power cylinder between the ends of said shoes, a piston positioned in said cylinder and arranged to act upon the shoe which anchors when the drum is turning in a forward direction, and a piston of larger diameter so positioned in said cylinder and arranged to act upon the shoe which anchors when the drum is turning in a rearward direction.

10. A brake operating mechanism comprising, in combination, a cylinder; pistons in opposite ends of said cylinder; a stop in said cylinder provided with oppositely extending flanged portions; and springs confined between said pistons and said stop surrounding said flanged portions and arranged to urge the pistons outwardly away from said stop.

11. A brake operated mechanism comprising, in combination, a double ended cylinder; pistons in opposite ends of said cylinder; a stop in said cylinder; and springs confined between said pistons and said stop arranged to urge the pistons outwardly away from said stop.

12. In brake mechanism of the class described, the combination of a brake drum; fluid motor means; a pair of brake shoes of substantially equal area including a forward shoe which is maintained in contact with the drum at least partially by the motor means during forward braking and a reverse shoe which is maintained in contact with the drum at least partially by the motor means during reverse braking, said fluid motor means including a large piston connected to said forward shoe and a smaller piston connected to said reverse shoe whereby greater force will be applied to said forward shoe than to said reverse shoe; means for withdrawing said shoes from engagement with said drum; and stop means definitely determining the release position of said shoes.

13. In brake mechanism of the class described, the combination of a brake drum; fluid motor means; a pair of brake shoes of substantially equal area including a forward shoe which is maintained in contact with the drum at least partially by the motor means during forward braking and a reverse shoe which is maintained in contact with the drum at least partially by the motor means during reverse braking, said fluid motor means comprising a two diameter cylinder having large and small pistons therein, said large piston applying said forward shoe and said small piston applying said reverse shoe whereby a greater force will be exerted on said forward shoe than on said reverse shoe; means for withdrawing said shoes from engagement with said drum; and stop means definitely determining the release position of said shoes.

14. In brake mechanism of the class described, the combination of a brake drum; fluid motor means; a pair of brake shoes, each of said shoes corresponding to substantially one-half of said drum, and one of said shoes being a forward shoe which is maintained in contact with the drum at least partially by the motor means during forward braking and the other of said shoes being a reverse shoe which is maintained in contact with the drum at least partially by the motor means during reverse braking, said fluid motor means including a large piston connected to said forward shoe and a smaller piston connected to said reverse shoe whereby greater force will be applied to said forward shoe than to said reverse shoe; means for withdrawing said shoes from engagement with said drum; and stop means definitely determining the release position of said shoes.

15. A brake comprising, in combination, a drum, a floating friction element within the drum having separable ends and arranged to have one part anchor when the drum is turning in the forward direction and to have a different part anchor when the drum is turning in the rearward direction, a cylinder arranged adjacent to said element ends and having its axis positioned along a chord of a drum, and two pistons in the cylinder acting respectively on said element ends, one of said pistons having a greater diameter than the other and acting upon the end of the friction element on which it anchors when the drum is turning in the rearward direction.

VINCENT BENDIX.